United States Patent Office 3,293,197
Patented Dec. 20, 1966

3,293,197
ELASTOMER BLENDING PROCESS
Harry L. Vincent, Stanton, and Norman Reginald Legge, Rolling Hills Estates, Calif., assignors to Shell Oil Company, New York, N.Y., a corporation of Delaware
No Drawing. Filed Aug. 15, 1963, Ser. No. 302,447
12 Claims. (Cl. 260—2.5)

This invention relates to a process for blending rubbers. More particularly, it is concerned with the blending of rubbers, one of which is in the form of a rubber cement and the other of which is in the form of an aqueous latex.

In the rubber art, the current trend is toward mixing two or more synthetic or natural rubbers in order to obtain compositions having a broader spectrum of optimum physical properties. This is often done during the milling or other masticating processes by manufacturers engaged in the formation of end products such as tires and the like. However, this requires extensive milling in order to obtain homogeneous compositions, in the course of which extensive degradation of the products may occur. It also requires stockpiling a multiplicity of individual rubbers.

Other problems are associated with the processing and preparation of rubbers per se. For example, diene elastomers having a high cis 1,4-content have many desirable physical properties in finished products. However, such elastomers possess the disadvantage of "poor processability" by which is meant that heavy work input is required for adequate mastication thereof. The poor processability is associated with relatively high average molecular weights of the high cis rubbers. High molecular weights are normally required since products of lower average molecular weight (i.e., low intrinsic viscosity) have certain disadvantages during the finishing processes involved in their manufacture. Thus, many lower molecular weight rubbers of either high, intermediate or low cis 1,4-content exhibit what is referred to as poor "green strength."

"Green strength" is a highly elusive quality to define in terms of measured laboratory properties. Broadly speaking, it includes both bulk viscosity and resistance to shear or tensile fracture over a wide range of temperatures and strain rates. In practical terms the absence of green strength is manifested as crumbling during mixing, yielding under static load conditions, sagging of hot extrudates, and myriad similar phenomena. Another important disadvantage of products of this character is their relatively poor driability. By this is meant the rate at which water can be readily removed from the product during the final stages of its manufacture. Since water is almost always utilized either in a coagulating bath or for transfer of the coagulated rubber from one point in the manufacturing plant to another, it is almost always necessary to subject the rubber to a drying step prior to being bailed. Low molecular weight rubbers and those having a low cis content are particularly objectionable in their poor drying characteristics. Probably this is due to collapse of the particulate structure from an initial porous structure to one of a more or less coalesced chewing gum like particle from which water can be expelled only with great difficulty..

It is an object of the present invention to provide an improved rubber blending process. It is another object of the invention to provide an improved process for blending rubbers initially existing in the form of a cement and a latex respectively. It is a particular object of the invention to provide a process for improving the green strength and/or driability of certain rubbers. Other objects will become apparent during the following description of the invention.

Now, in accordance with the present invention, an improved process for the blending of rubbers is provided comprising the steps of emulsifying a rubber cement with a rubber latex; destabilizing the latex rubber particles; subjecting the emulsion to a high rate of shear and steam coagulating the rubbers to recover a porous rubber crumb of the mixed rubbers.

A special aspect of the present invention comprises the incorporation of a reinforcing copolymer, e.g., styrene-butadiene copolymer in the form of a latex with a rubber in the form of a cement wherein the rubber is one having a relatively low intrinsic viscosity and/or low cis 1,4-content, the steps in the process being those outlined hereinabove.

While the broadest aspects of the present invention are not concerned with the precise identity of the rubbers involved the process of the invention is especially directed to the problem of uniformly blending a rubber existing initially in the form of a rubber cement or solution on the one hand with a rubber existing initially in the form of a latex. The problems associated with this type of blending operation are chiefly concerned with achieving uniformity of the eventual mixture while maintaining a set of conditions which will not unduly degrade the products nor require uneconomic procedures involving separate isolation and then reblending of each of the individual rubbers.

Thus, it can be seen that by "mixture" of rubbers is meant not only the blending of two or more different rubbers but actually includes the blending of two portions of the same type of rubber, one portion being in the form of a cement and the other being in the form of a latex. Normally, of course, this situation will not exist. The process is especially directed to situations in which the elastomer existing in the form of a cement is prepared from the monomer in this same medium. Of course, the most economic approach to the second component, mainly the elastomer latex, considers particularly latices in which the latex is prepared in a so-called "emulsion polymerization" process, typified by emulsion polymerization of styrene-butadiene rubbers.

Referring now to the problem of green strength and processability relative to conjugated diene elastomers, experts in the art are aware that these two phenomena involve physical properties which must be compromised. For example, in order to improve processability, other aspects such as stereoregularity being the same, it is necessary to reduce the average molecular weight of the elastomer such as being its preparation or by later mastication. This, however, degrades the green strength of the product. Thus, the problem concerned in this situation is one of improving the green strength and driability of the product without at the same time degrading the processability thereof. The present invention in one of its special aspects is concerned with resolving this problem.

While reference will be made during the ensuing description of the invention to particular classes of elastomer cements and latices, it will be understood that the invention is not restricted thereto.

The rubber cements with which the process of the present invention is concerned apply especially to hydrocarbon solutions of elastomers, particularly to hydrocarbon solutions of elastomers prepared from conjugated dienes, especially those having from 4–8 carbon atoms per monomer molecule. These include for example isoprene, butadiene and piperylene among others. Solution processes for the preparation of such elastomers result in the formation of cements, although pre-formed elastomers may be dissolved later in solvents to form cements. The concentration of elastomer in the cement may be optimized for best operation of the process. This will depend at least in part upon the fluidity of the resulting cement and this in turn is dependent not only upon the average molecular weight of the elastomer but its viscosity characteristics in the particular solvent employed. When utilizing relatively low boiling open chain hydrocarbons such as pentanes, mixed amylenes and the like or cyclic hydrocarbons such as benzene, toluene or cyclohexane, and when employing polymers such as polyisoprene or polybutadiene, the usual concentration of rubber in the cement is in the order of 5–20%, 7.5–15% being more common. Preferably, the elastomers are formed in situ in this solvent by utilizing a lithium based catalyst such as lithium metal, lithium alkyls or dilithium hydrocarbyl catalysts. For polyisoprene, the cis content of the product is relatively high, usually above 85%, while for polybutadiene the cis content of the product normally lies in the range of 35–40%. However, when polymerized in hydrocarbon solvents the polybutadiene is relatively low in 1,2 addition product, generally having less than 15%.

The intrinsic viscosity of the elastomers may be varied in accordance with the remarks made heretofore in this respect. For example, it may be desirable to prepare relatively low molecular weight polymers which inherently have relatively poor green strength but improved processability. These normally will have intrinsic viscosities in the order of 1.5–5 dl./g. where polyisoprene is concerned and less than about 2.0 dl./g. when polybutadiene is being prepared. On the other hand, higher average molecular weight products are those normally encountered in current commercial production, having intrinsic viscosities between about 5 and about 12 dl./g. (polyisoprene) and between about 2.0 and about 3.0 dl./g. (polybutadiene). As stated hereinbefore, these higher molecular weight polymers have relatively better green strength and driability but because of their high molecular weight exhibit certain deficiencies relative to processability. Mixed solvents, such as mixtures of aromatic hydrocarbons with lower molecular weight open chain hydrocarbons may be employed although open chain hydrocarbons such as $C_4$–$C_6$ alkenes or alkanes are preferred.

The latices forming the other essential component from which the subject rubber blends are prepared are typified but not restricted to elastomeric and resinous copolymers of styrene and butadiene. It is well known that these copolymers are prepared with a wide variation in the ratio of styrene to butadiene. The specific ratio employed in the present instance does not form an element of the present invention. Normally, however, the ratio will be between about 1:2 and about 1:20 moles of styrene to butadiene. Other copolymerizing monomers which may be utilized in forming suitable elastomers are vinyl tolune, alpha methyl styrene, 2-vinyl pyridine, 4-vinyl pyridine, acrylic monomers such as acrylonitrile and acrylate esters.

The elastomer latex may be prepared in situ during the copolymerization process or may be formed at any time subsequent to its polymerization. Economically, however, the latices formed in the so-called emulsion polymerization processes are those which are most attractive for use in the present process. In order to obtain suitable viscosities and economic treatment relative to disposal of water during the process, it is preferred that the latices employed comprise between about 15 and about 40 weight percent of polymer, the balance being substantially all water with an emulsifying amount of an emulsifying agent, preferably one or more of the great variety of soaps being employed for this purpose. These are well-known in the art of emulsion polymerization. The soaps most preferred include rosin acid soaps and the fatty acid soaps as well as various combinations thereof. The proportion of soap is also a matter well-known in the art of emulsion polymerization but will usually be between about 1 and about 10 parts per hundred contained rubber. The soap is chosen with regard to its emulsifying characteristics and ability to support polymerization as well as with regard to the ease of its hydrolysis for the purpose of destabilizing the latex during the process of this invention.

Summarizing the above, the following polymers typify the types of polymers which may be present either as the cement or latex components. Of course, mixtures of elastomers and/or resins may be present in either the cement or latex, prior to initiating the process of this invention.

ELASTOMERS

Natural rubber
Polyisoprene
Polybutadiene
Styrene-butadiene copolymers
Block copolymers of styrene and butadiene
Block copolymers of styrene and isoprene
Hydrogenated derivatives of the above
Epoxidized derivatives of the above
Polychloroprene
Butadiene-acrylonitrile copolymers
Isobutylene-isoprene copolymers The first step in the present invention comprises intimate mixing of the rubber cement and the rubber latex. Thus, this step in the process involves utilization of the emulsifying agent already present in the rubber latex to which may be added further amounts of emulsifying agent if necessary. Mixing may take place by any usual means, such as a double screw pump or other mixing apparatus. The proportion of cement to latex is of major importance and will depend both upon the ratio of the two rubbers eventually desired in the mixture obtained at the end of the process and the rubber contents of the latex and the cement. Usually, however, the cement and latex are mixed in proportions from about 1:1 to about 10:1 volumes of cement per volume of latex. Mixing may be conducted at any desired temperature but ambient temperature is the most attractive. The ratios of cement to latex are chosen so that there will always be a water-in-oil emulsion. The product composition can be controlled by both the cement to latex ratio and the total rubber contents of the latex and cement.

The second stage in the process comprises destabilizing of the latex particles sufficiently to promote their growth to larger particle size. Otherwise, the latex particles remain unchanged in the coagulation water and are lost. Destabilization is usually effected by the addition of acid to the emulsion. The amount of acid should be sufficient to essentially neutralize the soap emulsifier. Insofar as the pH of an emulsion can be determined, this is usually between pH 3 and 4.5. The choice of acid is incidental to the process but will normally comprise a mineral acid for economic reasons. The precise amount of acid employed will be chosen by trial and error with specific soaps, cements and latices. When employing a cement involving a conjugated diene elastomer in a volatile hydrocarbon and a styrene-butadiene latex containing 4–10 phr. soap, the proportion of acid is preferably in the order of 1–10 phr. sulfuric acid based on the copolymer. This not only results in destabilizing the latex copolymer (or other rubber) particles, but also encourages the latter to be wetted by the cement. This in turn promotes the intimate mixing of the two elastomers.

The further essential stage in the process of the invention comprises subjecting the destabilized emulsified mixture to a high rate of shear for further promoting the intimate mixing of the rubbers from the two separate phases. By "high rate of shearing" is meant something more than simply subjecting the destabilized emulsion to stirring or the like. On the contrary, a high degree of shearing is regarded as that degree of shearing obtained in a colloid mill, a Waring blender or other shearing devices such as spinning discs or circular saw blades within confined spaces.

The most preferred form of shearing device utilized for this purpose comprises a pump housing having an inlet and outlet, a rotating rod on which are positioned circular plates or saw blades, preferably separated from one another by baffles to encourage a maximum contact with the emulsion when passed therethrough. The discs are rotated at a rate of at least about 1500 r.p.m and preferably at least about 4000 r.p.m, dependent in part upon the diameter of the blades or discs. When the discs comprise saw blades, the teeth may be set at any desired angle, preferably at a sharp angle, to the direction of rotation. The action of these spinning disc dispersers has been found to be especially effective for use in the present process. The term "high rate of shear" might be referred to as "colloiding" although the rate of shear may be expressed in certain instances as being greater than about 1000 reciprocal seconds.

When the destabilized emulsion has been subjected to the high rate of shearing, thereby creating a still more intimate mixture of the several components, the next essential state comprises coagulation of the mixed rubbers and separate recovery from the cement solvent. While coagulation may be accomplished by any desirable means known in the general art of elastomer recovery, it is preferred that this be effected with steam or hot water and that a high rate of shearing is present at the instant of coagulation. This is best effected by passing the homogenized, destabilized, and sheared emulsion through an orifice containing inlets both for the emulsion and for the steam or superheated water or mixtures thereof. The contact of the emulsion with steam causes what in effect is an explosion of the rapidly volatilizing cement solvent at the exit from the orifice, such that the solvent is flashed off and removed while the mixture of elastomers is instantaneously coagulated in the form of a highly porous particulate product. This is dropped into a conveying bath such as hot water for the purpose not only of conveying but also of removing by volatilization additional amount of residual solvent which still may be present.

While the above steps constitute the essential steps in the process of the present invention, it is usually necessary to subject the product obtained to drying procedures unless it is to be employed immediately in some processing stage where wet processing is involved. Thus, the stage following coagulation usually comprises draining the major proportion of water from the porous particulate product such as by passage over a screen or belt to obtain the products wet with only a small proportion of the water. This product is then passed to a dehydrating mechanism such as a moving belt inside of a heated space.

One aspect of the present invention is involved in the driability noted at this point in the process: When cement polymers having relatively poor driability characteristics (either because of stereostructure or because of relatively low molecular weight) are employed, then it is desirable to incoporate by means of the latex a polymer or copolymer which will support it, so to speak, during this drying at elevated temperatures. The porous structure thus is preserved, enabling the ready escape of water therefrom.

The proportion of cement elastomer to latex elastomer will depend upon the desired final product as well as upon the necessity (or non-necessity) for modifying the driability or green strength characteristics of one or the other of the elastomers. Usually, however, the present process contemplates the use of weight ratios of cement polymer to latex polymer between about 90:10 to 10:90, still more usually between about 75:25 to 25:75.

The product of the present invention and the process itself may be still further modified by incorporating other rubber compounds ingredients, principally rubber extending oils and carbon blacks. Due to the several stages in the present invention, there are specific points therein which are advantageous or preferred for the incorporation of each of these optional components. For example, the incorporation of a rubber extending oil is preferably effected prior to the formation of the initial emulsion and it may be advantageous to do this by addition to the latex. Even though it may be easier to add oil to the cement in which it would be soluble, if the viscosity of the latex polymer is considerably higher, addition to the latex phase is favored. This is due to the fact that homogenization of the polymer (either during emulsification or subsequent shearing) is promoted if the two solid rubber phases have viscosities which are not too dissimilar. In the case cited, the addition of oil emulsion to the latex lowers the solid rubber viscosity bringing it closer to that of the solid elastomer present in the cement. Therefore, the addition of rubber extending oils is preferably effected by adding the oil to the latex prior to emulsification with the elastomer cement. The proportion of extending oil is within the skill of the art but will normally be between about 5 and 50 parts by weight per hundred parts of the latex elastomer.

The incorporation of carbon blacks into the composition being considered is preferably accomplished after the intial destabilization stage, by means of an aqueous slurry of the black. If the aqueous slurry of carbon black is added prior to destabilization, the stable latex is unduly diluted by the water phase of the carbon slurry and the subsequent coagulation of the acidified mixture results in relatively large latex elastomer particles in the final crumb. This in turn reduces the homogeneity of the crumb and decreases the driability thereof. The addition of aqueous carbon black dispersion needs to be followed by some form of high shear. This may be done by providing a second high shear stage and adding the black in between the two high shear stages.

The following examples illustrate the process of the present invention:

Example 1

The cement employed for the purpose of this example comprised a solution of high cis polyisoprene having an intrinsic viscosity of 3.5 dl./g. in isopentane, solids content of the cement being 14.8% by weight, which was reduced to 7.4% by weight of addition of further proportions of isopentane. The emulsion polymer to be combined with this cement comprised a styrene-butadiene (SBR) polymer latex containing 15.7% by weight of styrene-butadiene (24% bound styrene) polymer and 7.9% by weight of a highly aromatic rubber extender oil. 52 pounds of the SBR latex (containing a mixture of rosin soap and fatty acid soaps) were pressured through a control valve to a screw pump at a rate of 4 pounds per minute (0.475 gallon per minute). The polyisoprene cement and added isopentane (55 pounds each) were pumped through a constant flow gear pump to the screw pump at a rate of 8.4 pounds per minute (1.6 gallons per minute). After emulsification of the cement in the latex, the emulsion was acidified with 6 normal sulfuric acid sufficient to neutralize the soap, about 2.25 phr. $H_2SO_4$ based on the styrene-butadiene polymer being employed.

During destabilization of the emulsion by acid addition, the emulsion was passed through a shearing device comprising circular saw blades positioned in a pump casing rotating at about 3450 r.p.m. The sheared, destabilized emulsion was then coagulated by direct content with steam from a two-orifice steam ejector nozzle, into a hot-water bath maintained at about 95° C., the steam pressure being about 120 p.s.i.g. The solvent was flashed off the coagulated mixed rubber recovered as damp crumb which was then dried under standard conditions at 90° C. The mixture prepared as described could be dried to less than 0.2% water content at a rate of about 1.8 pounds per hour per square foot of drying surface. Compared with this, the relatively low molecular weight polyisoprene employed in this example when recovered according to the normal procedure by coagulation of the described cement without prior mixing with SBR and shearing as described, could not be satisfactorily dried under the same conditions.

Example II

The cement employed for this example was polybutadiene having an intrinsic viscosity of 1.9, the solvent being a mixture of pentanes and hexanes and the solids content of the cement being 18.4%. The same styrene-butadiene copolymer latex containing aromatic extending oil described in Example I was utilized in this example as well. 58.5 pounds of latex and 50 pounds of cement were employed together with 50 pounds of added mixed amylene solvent. The procedure of emulsification, acidification and shearing was substantially the same as described in Example I. Coagulation was by means of steam (120 p.s.i.g.) through a 2-nozzle orifice, the steam rate being 4.25 pounds per minute and the ratio of steam to polybutadiene being about 5.13. The products still obtained could be dried at a rate of about 1.5 pounds per hour per square foot of drying area, while the unmodified polybutadiene recovered by steam coagulation was essentially undriable.

We claim as our invention:

1. A rubber blending process comprising:
   (a) emulsifying a rubber cement with a rubber latex;
   (b) adjusting the pH of the emulsion to between about 3 and about 4.5;
   (c) subjecting the emulsion to a high rate of shear; and,
   (d) steam-coagulating the rubbers, whereby cement solvent is flashed off and coagulated rubber crumb is recovered.

2. A rubber blending process comprising:
   (a) emulsifying a cement, comprising a hydrocarbon solvent having a diene elastomer dissolved therein, with a soap-stabilized latex comprising water and an elastomeric diene-vinyl diene substituted arene copolymer;
   (b) adjusting the pH of the emulsion to between about 3 and about 4.5, whereby the soap is hydrolyzed and copolymer particles are destabilized;
   (c) subjecting the emulsion to rate of shear in excess of 1000 reciprocal seconds; and,
   (d) steam coagulating mixture of rubbers, whereby cement solvent is separately recovered from coagulated mixed rubber particles.

3. A rubber blending process comprising:
   (a) emulsifying a cement, comprising a hydrocarbon solvent having a diene elastomer dissolved therein, with a soap-stabilized latex comprising water and an elastomeric diene-vinyl diene substituted arene copolymer;
   (b) adjusting the pH of the emulsion of between about 3 and about 4.5, whereby soap is hydrolyzed and copolymer particles are destabilized
   (c) subjecting the emulsion to rate of shear in excess of 1000 reciprocal seconds; and,
   (d) coagulating the mixture of rubbers at orifice with steam having a pressure of at least about 90 p.s.i.g., whereby cement solvent is flashed off and mixed elastomer crumb is formed.

4. The method of blending rubbers comprising:
   (a) emulsifying a conjugated diene elastomer cement with a latex of an elastomeric copolymer of a conjugated diene and a vinyl arene, said latex being stabilized with a soap;
   (b) hydrolyzing a sufficient amount of soap in the emulsion with a mineral acid to destabilize the latex elastomer particles;
   (c) subjecting the destabilized mixture to a rate of shear in excess of 1000 reciprocal seconds; and,
   (d) feeding the sheared emulsion in one orifice of a two-fluid nozzle, steam being fed through the inlet to a second orifice thereof, substantially immediately ejecting the mixture into a water bath, the inlet steam pressure being at least 90 p.s.i.g., the temperature of the water bath being maintained sufficient at the process pressure to flash off the major proportion of the cement solvent at the nozzle outlet whereby porous mixed rubber crumbs are formed.

5. A process according to claim 2 wherein the diene elastomer in the cement has an intrinsic viscosity less than about 5 dl./g.

6. In a process according to claim 2, the step following step (d) comprising subjecting the mixed rubber particles to drying at an elevated temperature.

7. In the process for improving the driability of a diene elastomer having an intrinsic viscosity less than 4.5 dl./g., which comprises carrying out the steps according to claim 2 and thereafter subjecting the mixed rubber particles so obtained to drying at elevated temperatures.

8. The process of forming a carbon black masterbatch with a mixture of rubbers which comprises carrying out the process of claim 2, and adding an aqueous slurry of carbon black to the emulsion during step (c).

9. A process according to claim 2 wherein the cement elastomer is polyisoprene and the latex copolymer is a styrene-butadiene copolymer.

10. A process according to cliam 2 wherein the cement elastomer is polybutadiene and the latex copolymer is a styrene-butadiene copolymer.

11. A process according to claim 2 wherein the soap-stabilized latex contains a rubber-extending oil 5–50 parts by weight per 100 parts of copolymer.

12. A process according to claim 2 wherein the weight ratio of diene elastomer to copolymer is between about 10:1 to 1:10.

References Cited by the Examiner

UNITED STATES PATENTS 3,041,299   6/1962   Gzemski et al. _____ 260—29.7

MURRAY TILLMAN, *Primary Examiner.*

M. FOELAK, *Assistant Examiner.*